US008930041B1

(12) United States Patent
Grimm et al.

(10) Patent No.: US 8,930,041 B1
(45) Date of Patent: Jan. 6, 2015

(54) METHODS OF OPERATION FOR PLUG-IN WIRELESS SAFETY DEVICE

(71) Applicant: GM Global Technology Operations LLC, Detroit, MI (US)

(72) Inventors: Donald K. Grimm, Utica, MI (US); Upali Priyantha Mudalige, Oakland Township, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 13/929,534

(22) Filed: Jun. 27, 2013

(51) Int. Cl.
*G06F 7/00* (2006.01)
*B60R 16/023* (2006.01)

(52) U.S. Cl.
CPC .................................. *B60R 16/0231* (2013.01)
USPC .............................................. 701/1; 370/338

(58) Field of Classification Search
USPC .............................................. 701/1; 370/338
See application file for complete search history.

(56) References Cited

U.S. PATENT DOCUMENTS 6,675,082 B2 1/2004 Galli et al.
7,990,283 B2 8/2011 Breed
8,199,028 B2 6/2012 Mudalige
8,306,735 B2 11/2012 Mudalige
2011/0130916 A1 * 6/2011 Mayer ............................ 701/33

OTHER PUBLICATIONS

Grimm, Donald, U.S. Appl. No. 61/765,243, filed Feb. 15, 2013, entitled "Apparatus for Smart Antenna Sharing in a Vehicle and Methods for Implementing the Apparatus".

* cited by examiner

*Primary Examiner* — Mary Cheung
*Assistant Examiner* — Yuen Wong
(74) *Attorney, Agent, or Firm* — John A. Miller; Miller IP Group, PLC

(57) ABSTRACT

An aftermarket plug-in safety device that allows a vehicle to communicate with other vehicles or infrastructures in a V2X communications system. The device includes a radio for transmitting and receiving signals and a GPS receiver for receiving GPS signals and providing vehicle position data. The device also includes a memory for storing digital security certificates and vehicle application data and a processor configured to be put in electrical communication with a vehicle CAN bus. The processor receives vehicle location signals from the GPS receiver, files from the memory and signals from the radio and providing signals for transmission to the radio. The processor identifies the vehicle that the plug-in device is coupled to and provides data on the CAN bus identifying the device. The processor also performs self-configuring operations based on type of vehicle, access to vehicle systems and location of the vehicle.

22 Claims, 3 Drawing Sheets

METHODS OF OPERATION FOR PLUG-IN WIRELESS SAFETY DEVICE

BACKGROUND OF THE INVENTION

1. Field of the Invention

This invention relates generally to an aftermarket plug-in or dealer retrofit device providing vehicle wireless communications and, more particularly, to an aftermarket plug-in device that can be coupled to a vehicle's on-board diagnostic (OBD) connector or another accessible location to provide vehicle-to-vehicle (V2V), vehicle-to-infrastructure (V2I) communications or vehicle-to-entity communications (V2X).

2. Discussion of the Related Art

Traffic accidents and roadway congestion are significant problems for vehicle travel. Vehicular ad-hoc network (VANET) based active safety and driver assistance systems, such as a dedicated short range communications (DSRC) system, known to those skilled in the art, allow a vehicle to transmit messages to other vehicles in a particular area with warning messages about dangerous road conditions, driving events, accidents, etc. In these systems, either direct broadcast communications or multi-hop geocast routing protocols, known to those skilled in the art, are commonly used to communicate warning messages, i.e., to deliver messages to vehicles that are within direct communication range or are located within a few kilometers from the road condition. In other words, an initial message advising drivers of a potential hazardous condition is transmitted from vehicle to vehicle either in a direct broadcast fashion or by using a geocast routing protocol so that vehicles within the desired application range will receive the messages of interest.

The communications systems referred to above include vehicle-to-vehicle (V2V) and vehicle-to-infrastructure (V2I) applications that require a minimum of one entity to send information to another entity. Broadly, short range communications that occur between a vehicle and any similarly equipped external object may be referred to as "V2X" communications. For example, many vehicle-to-vehicle safety applications can be executed on one vehicle by simply receiving broadcast messages from one or more neighboring vehicles. These messages are not directed to any specific vehicle, but are meant to be shared with a vehicle population to support the safety application. In these types of applications where collision avoidance is desirable, as two or more vehicles talk to one another and a collision becomes probable, the vehicle systems can warn the vehicle drivers, or possibly take action for the driver, such as applying the brakes. Likewise, roadway infrastructure components, such as traffic control units, can observe the information broadcasts or otherwise sense vehicle traffic and provide a driver warning if there is a detected hazard (e.g., if a vehicle is approaching a curve at an unsafe speed or there is a crossing vehicle that is violating a red traffic signal phase).

Since V2X communications is a cooperative technology, the system is dependent on other similarly equipped entities in order to provide safety benefits. As such, V2X systems are subject to the network effect, where the value of the system increases as the fleet penetration increases. In the early years of deployment, certain safety and other features may only be available in a limited fashion, as the number of communicating vehicles is not sufficient to provide safety benefits on a large scale. Existing vehicles without communications equipment will not be able to communicate with newer vehicles that have been deployed with a V2X communications system. Therefore, it may be desirable to provide an aftermarket device that is capable of being plugged into an existing vehicle to allow that vehicle to be capable of providing vehicle location and state information to other vehicles and enable a variety of V2X features on the host vehicle using location and state information that is obtained from other communicating vehicles.

SUMMARY OF THE INVENTION

In accordance with the teachings of the present invention, an aftermarket plug-in safety device is disclosed that allows a vehicle to communicate with other vehicles or infrastructures in a V2X communication system. The device includes a radio (e.g., DSRC, Wi-Fi, Bluetooth, LTE, etc.) for transmitting and receiving signals and a global navigation satellite system (GNSS) receiver for receiving location signals and providing vehicle position data. The device also includes a secure memory for storing digital security certificates, memory for vehicle application data and a processor that is communicatively coupled to the vehicle CAN bus. The processor receives vehicle location signals from the GPS receiver, determines the host vehicle state either indirectly, i.e., by deriving speed or acceleration information from the GPS data over time, or directly receives signals from the radio by reading state information from the vehicle CAN bus interface, and provides signals for transmission to the radio. The processor identifies the vehicle that the plug-in device is coupled to so as to determine host vehicle human-vehicle interface capabilities or vehicle actuation capabilities, and provides data on the CAN bus identifying the device to enable the vehicle to authenticate the device. The processor also performs self-configuring operations based on type of vehicle, access to vehicle systems and location of the vehicle.

Additional features of the present invention will become apparent from the following description and appended claims, taken in conjunction with the accompanying drawings.

DETAILED DESCRIPTION OF THE EMBODIMENTS

Figure 1:
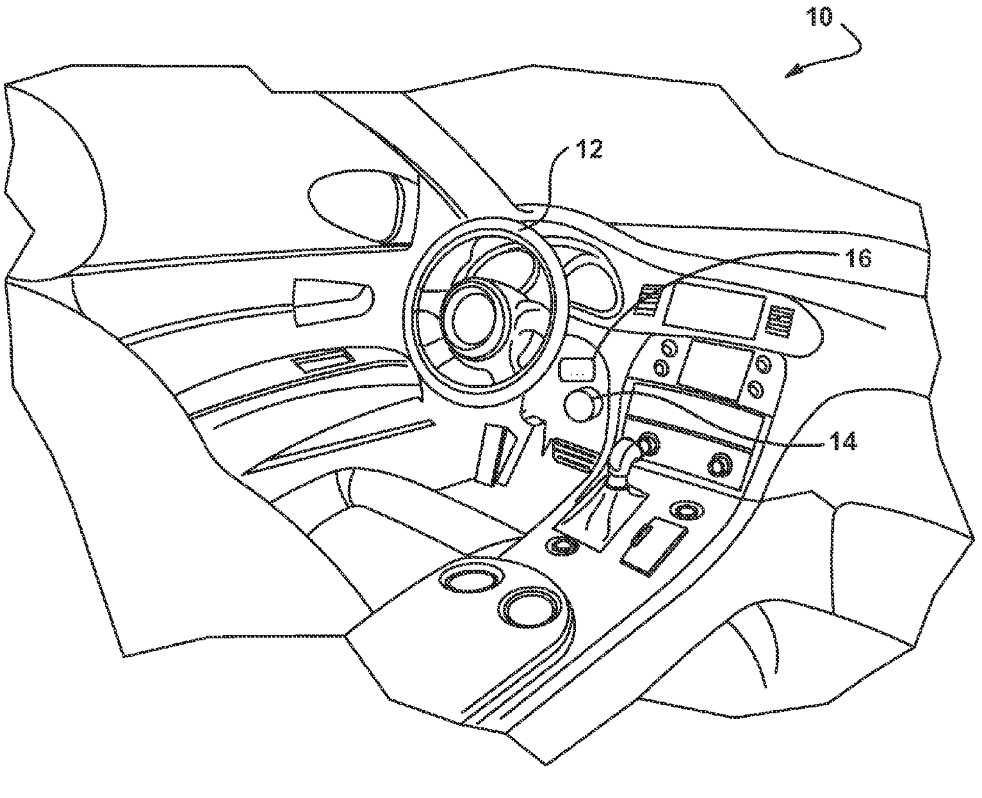
FIG. 1 is an illustration of a partial interior of a vehicle including a plug-in safety device.

The following discussion of the embodiments of the invention directed to a plug-in safety device for V2X communications is merely exemplary in nature, and is in no way intended to limit the invention or its applications or uses.

As discussed above, V2X communications systems are currently being developed that allow the vehicles that have these systems to communicate with one another so that these vehicles are able to provide warnings that can be received by the other vehicles. In an effort to provide safety benefits for those vehicles currently on the roadway that do not have V2X communications capabilities, the present invention proposes a plug-in device that is capable of providing V2X communications when connected to the vehicle. The plug-in device can be connected to the vehicle at any suitable and available location (e.g., diagnostics port, adjacent to an existing vehicle electronic control module using a junction connector, or into a new or existing accessory port such as USB or other interface that is provided by the OEM to accommodate brought in devices). All vehicles manufactured beginning in 1996 are required to have an on-board diagnostic (OBD) system that provides diagnostic signals having known messaging formats and protocols identifying the state of health of vehicle components, devices and sub-systems through an OBD connector. The connector is normally required to be located under the vehicle steering column. The OBD connector provides one suitable location for accepting the plug-in device.

As will be discussed in further detail below, the plug-in device will have the ability to identify the vehicle's capabilities and parameters once it is plugged in by receiving signals from the vehicle's controller area network (CAN) bus. The device will also provide information about the device to the vehicle CAN bus and may actuate a variety of in-vehicle systems (e.g., including, but not limited to, driver displays, audible chimes, haptic seat, braking, throttle or steering systems). For example, the device will be able to identify the make and model of the vehicle and specific on-board features that vehicle may have, such as warning chimes, seat vibration, displays, etc. The device self-configures system algorithms based on the determined capabilities and system security access, i.e., the authorized data set that is provided by the vehicle manufacture to the plug-in device, and self-configures operational modes based on system security access and vehicle capabilities (e.g., if the vehicle does not provide any audible warning interface, the device may generate its own audible alerts). Based on that knowledge, the algorithms operating on the plug-in device can be adapted for the particular vehicle that the device is connected to.

The plug-in device will also identify, typically through GPS, the location of the vehicle, and subsequently adhere to the operational standards that are in place for the identified region (e.g., over-the-air message format, congestion control mechanism, transmission frequency, etc.). Region information can be determined from a local digital map database or from a cloud database API that provides access to country information. For example, different regions, such as the United States or Europe, have certain variations in terms of radio channel usage, messaging protocols, application set, or application behavior. Also, some locations, such as satellite ground based station locations, do not allow communications at certain frequency bands. The plug-in device would identify when the vehicle is in proximity to one of these locations by accessing a database that is local to the device or stored remotely in the cloud and disable communications upon entry to one of these areas and resume communications upon exiting one of these areas. The plug-in device will provide a driver indication that the system is disabled when an entry into the restricted area has been determined. Such adaptations by region illustrate how location information can be used at a macroscopic level to configure device operation in accordance with regional standards. Within a particular region, road-level location information can enable other types of adaptations. The device may self-configure feature priorities based on local real-time or historic traffic data, such as provide an indication when the vehicle is approaching busy intersections, or by adapting the warning time at such locations, i.e., adjust the warning to a conservative setting. Additionally, feature sensitivity can be adjusted based on local environment, such as increased sensitivity near schools (e.g., increasing the sensitivity of pedestrian detection applications) and rural areas (e.g., increasing the sensitivity of oncoming vehicle applications), and level of driver engagement, for example, the warning time is adjusted to a more conservative setting if the driver monitoring system is detecting that the driver is distracted or drowsy.

The plug-in safety device also allows the user to configure or set parameters for the particular user so that the operation of the device can be personalized to that user, where these features may include such elements as warning timing (e.g., allow the user to adjust when alert is provided in accordance with their preferred driving style), which available features are enabled, etc. Once those features are set into the device, the settings will remain with the device so that if the device is taken from one vehicle to another vehicle, such as a rental car, those settings would automatically be used for the new vehicle. Configuring the system parameters for a particular user can be accomplished in a number of ways, such as by using a smart phone (the user could pair to the plug-in device and enter configuration settings on the smart phone device), using near field communications (NFC) (the user could specify the desired settings on a smart phone or laptop computer and use NFC to communicate the settings to the plug-in device), through WiFi or Bluetooth devices, through OnStar™, etc. Further, a USB connection could be made to a laptop, where the laptop would recognize the device and bring up an application that enables the user to enter the desired device settings. Examples of features that could be turned on and off include warnings for vehicles traveling with hazard lights, disabled vehicle, hard braking vehicle, etc. Further, the device can be configured so that some features may be active when the vehicle is traveling above a certain speed. The user would have the option of specifying different speed ranges for different applications. Also, driver warnings could be configured by distance (e.g., an alert is provided if the host vehicle is within 250 meters of the event) or preferred notification time (e.g., an alert is provided if the host vehicle is within seven seconds of the event based on the current host vehicle speed).

The message transmitted between vehicles as discussed herein must be secure to prevent hackers from broadcasting improper messages. In one known protocol, the messages are typically signed and authenticated using digital signatures based on an underlying public key infrastructure (PKI) in accordance with the IEEE 1609.2 standard specification. Each principal in a PKI system has a pair of keys, namely, a private key and a public key. The private key is known only to the principal and the public key can be shared with other entities in the system. The keys can be visualized as a pair of functions $P_r$ and $P_u$ representing the private and public keys, respectively, and having the property $M=P_r(P_u(M))$ and $M=P_u(P_r(M))$, where M is the message that is to be secured using the keys. To ensure message integrity, the sender of the message signs the message with its private key, and adds the signature to the message. Upon receiving the message, the recipient can verify the signature of the message using the sender's public key.

A fundamental problem in the PKI architecture is the exchange of the public keys without compromising them. One widely accepted solution is for a trusted entity, known as a certifying authority (CA), to digitally sign data structures, known as certificates, that state the binding nature between names and public keys. In the case of the IEEE 1609.2 standard, a certificate includes several fields, namely, the public key, geographic scope or region of the certificate, a certified revocation list series number associated with the certificate, the expiration time of the certificate and the signature of the CA. In order to verify the certificates signed by the CA, the public key of the CA must be available at each entity of the PKI system. Because the distribution of all of the certificates issued by the CA is impractical, the IEEE 1609.2 standard specifies that a sender should add its certificate to a signed message.

In one non-limiting embodiment, the messages transmitted by the plug-in device are signed with a certificate, and those certificates are continually being updated for security purposes. It will eventually be necessary to provide new certificates to the plug-in device that are used to sign the messages. Various techniques are proposed to allow the device to receive the new security certificates, such as connecting the device to a laptop computer or taking the device to a dealership, the Department of Motor Vehicles, a certificate kiosk, etc.

The device provides identity information to the vehicle, such as device type or manufacturer, third party subscriber information, etc. The access of the plug-in device to the various vehicle systems may be fully or partially granted according to any number of protocols or rules, which may be regional, original equipment manufacturer (OEM) specific, etc. Such access limitations enable device and/or vehicle manufactures to enter into licensing agreements and share the vehicle propriety data that enables specific V2X applications. Such a design also enables specific categories of devices that may be sold in the market, such as (1) transmit-only devices that provide simple vehicle awareness, (2) transmit/receive devices that provide driver warnings or (3) more advanced devices that perform certain types of vehicle control functions. In this design, a vehicle manufacturer could grant access to vehicle systems based on the device type that is supplied by the plug-in device. Such classifications defined by the device manufacturer or OEM can be used to restrict access to vehicle data and/or enforce standard compliance, determine device certification status, restrict access to purchased services, etc. Different access levels may include access to vehicle information systems (such as vehicle sensors) non-safety related vehicle actuators that have both read and write capabilities, such as heated mirror on/off, or seat positioning system, vehicle displays including visual displays such as a driver information center, center stack, audible chime system or haptic interfaces. If so authorized, the device may have access to vehicle control systems, such as safety enhancing systems (e.g., headlight aiming, windshield wipers) and critical safety systems, such as braking, steering, throttle, etc.

Access granted by the device could depend on its location, for example, North America or Europe, where there may be different policies in place that govern the type of vehicle display or vehicle control operations that may be performed. Regional requirements may define congestion control mechanisms, such as the power of the transmitted message or the rate of the transmitted message. The region may also set security policies, such as how often the digital certificates are replaced or rotated. The device access and operation may be limited based on locality, where the device may be disabled in prohibited areas, such as near terrestrial satellite or military locations, safety features may run at higher rates at high risks areas, such as intersections, various feature functionalities can be adapted for different geographic locations and predicted level driver engagement, etc.

FIG. 1 is a broken-away perspective view of an interior of a vehicle 10 having a steering wheel 12. The vehicle 10 also includes a plug-in safety device 14 of the type discussed above plugged into an on-board diagnostic (OBD) connector 16 under the steering wheel 12. This is by way of a non-limiting example in that the device 14 can be connected to the vehicle 10 at any suitable connection location where it would be able to receive signals from the vehicle CAN bus depending on the type of vehicle, the capabilities of the device 14, etc.

Figure 2:
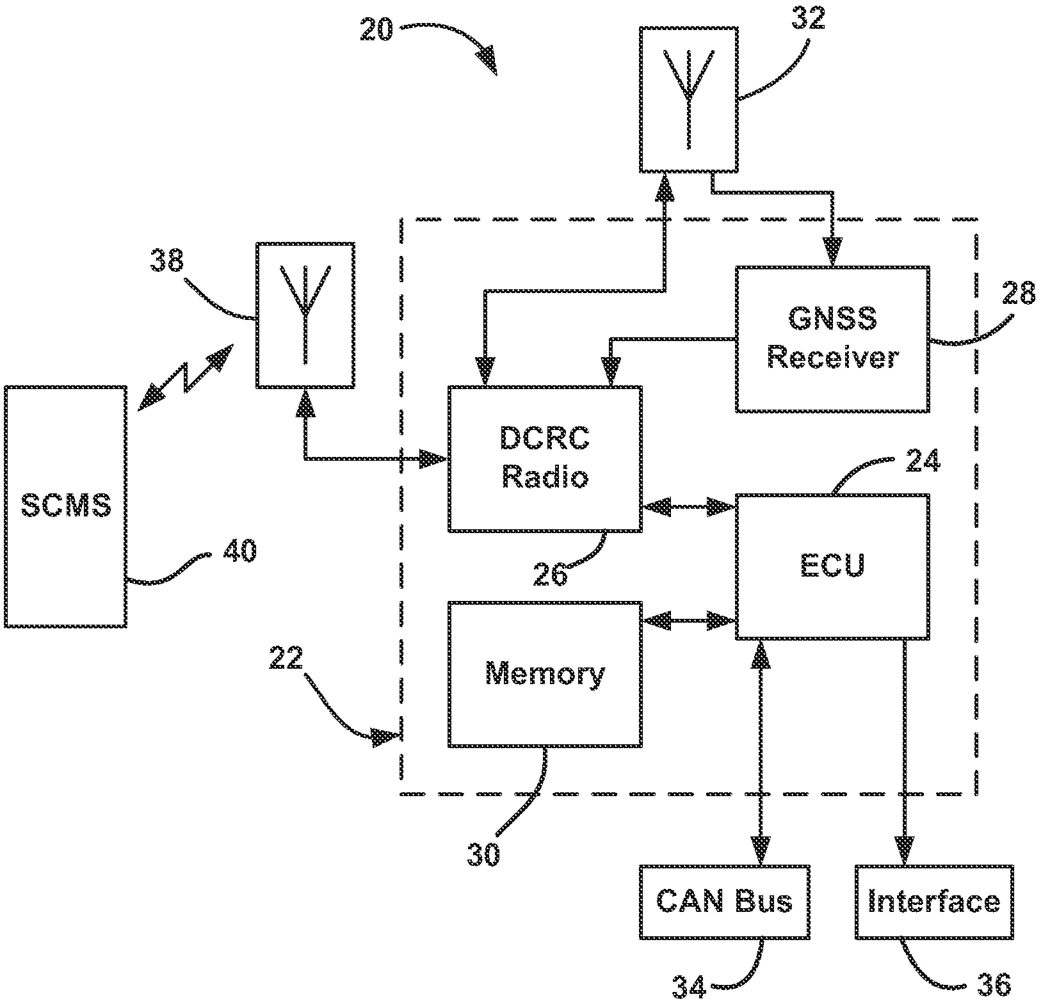
FIG. 2 is a schematic block diagram of the plug-in safety device referred to in FIG. 1.

FIG. 2 is a schematic block diagram of a vehicle system 20 including a plug-in safety device 22, such as the device 14. The device 22 includes an ECU 24 that runs the various algorithms and protocols discussed herein for operation of the device 22. The device 22 also includes a DCRC radio 26 that receives and transmits the V2X communications signals and messages that are up-converted for transmission, down-converted for reception, amplified, filtered, converted between analog and digitals signals, etc. Other types of radios can also be used, such as Wi-Fi radios, Bluetooth radios, long term evolution (LTE) radios, etc. The received signals are converted from analog signals to digital signals and then sent to the ECU 24 and the digital signals from the ECU 24 for transmission are converted to analog signals for up-conversion. The device 22 also includes a global navigation satellite system (GNSS) receiver 28 that receives GPS signals, where the receiver 28 provides time keeping signals to the radio 26 and vehicle position signals to the ECU 24. Such a GNSS system may include the existing GPS, Galileo, etc. systems and/or ground-based systems that provide their own location information or augment the satellite based systems. Some device embodiments may utilize the existing positioning system of the vehicle through data that is obtained through the vehicle serial data bus. The device 22 also includes a suitable memory 30 that stores data necessary to run the algorithms and protocols in the ECU 24, such as security certificates, certificate revocation lists (CRL), application data, etc. The vehicle system 20 includes a GPS antenna 32 that provides the GPS signals to the GPS receiver 28. Additionally, the antenna 32 can be used to transmit signals provided by the radio 26 or receive V2V or V2I communications signals that are sent to the radio 26. In an alternate embodiment, separate antennas are provided for the GPS signals and the DSRC communications signals.

Vehicle dynamics and operational state data available on a vehicle CAN bus 34 is provided to the ECU 24 and the ECU 24 provides necessary signals on the CAN bus 34 for proper vehicle operation. The ECU 24 provides signals to a driver vehicle interface 36 intended to represent any or all of the various devices that could provide advisory or warning sounds, visual displays, seat vibrations, steering wheel vibrations, etc. as warnings in a safety application. As mentioned above, the digital certificates stored in the memory 30 will need to be updated periodically. Box 40 represents a security credential management system (SCMS) that has some applicable infrastructure, such as those mentioned above, that processes requests for, generates and delivers security certificates to users and maintains and delivers CRLs. An antenna 38 provides the communications link between the radio 26 and the SCMS 40 for this purpose.

Figure 3:
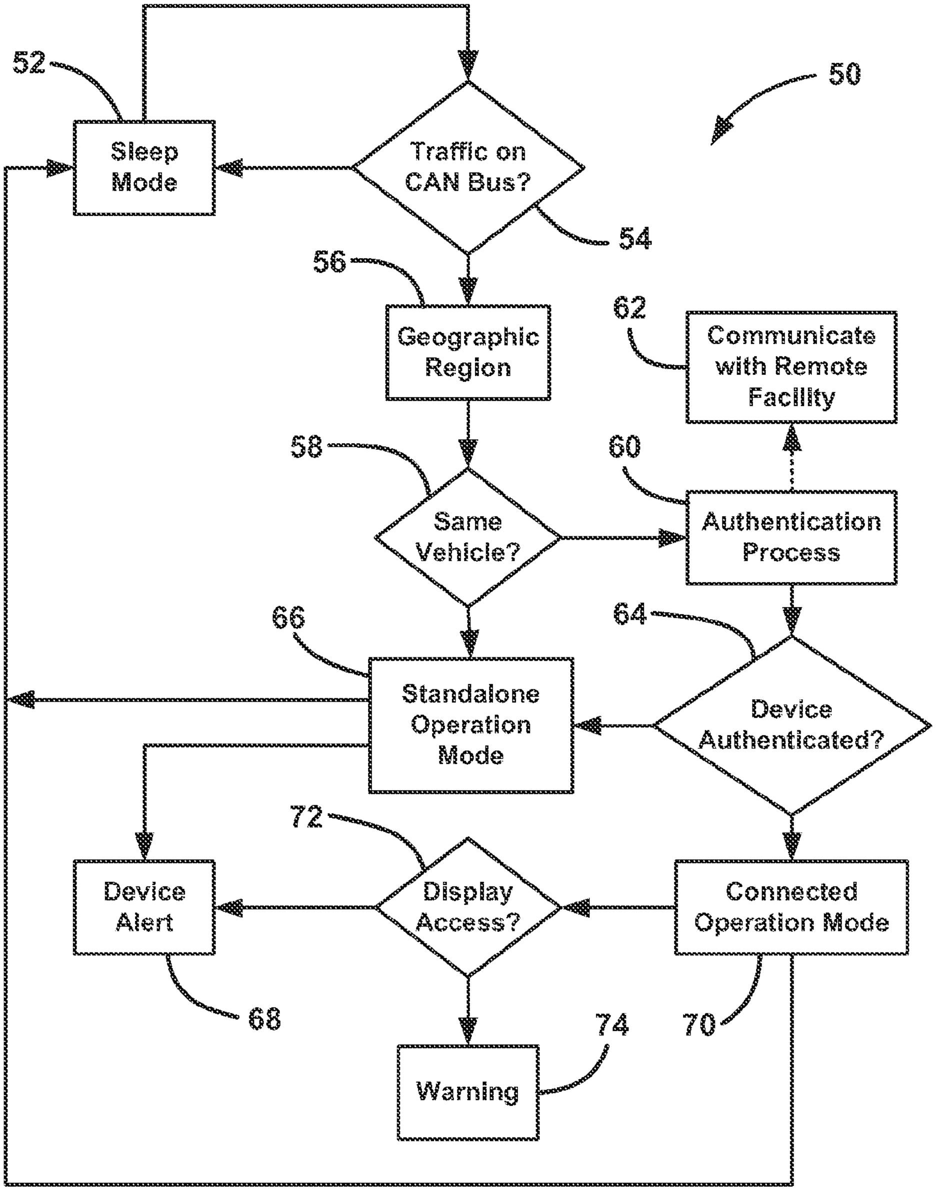
FIG. 3 is a flow chart diagram showing a process for operating the plug-in safety device.

FIG. 3 is a flow chart diagram 50 showing a high level operation of the plug-in safety device 22 discussed herein. At box 52, the device 22 is in a sleep mode where the device 22 has been previously formatted for a particular user, has been plugged into a particular vehicle, and the vehicle is in an off condition where there is no vehicle bus traffic. In this condition, the device 22 goes into the sleep mode to wait for vehicle activity where it may be needed. During the sleep mode, the device 22 is powered through the OBD connection 16 and periodically sends out a polling signal to decision diamond 54 to determine whether there is traffic on the CAN bus 34 and the device 22 should wake up for operation. If no bus traffic is detected, then the device 22 remains in the sleep mode at the box 52. In an alternate embodiment, the device 22 may be equipped with a vibration sensor, where the polling signal determines if vibrations have been sensed at the decision diamond 54 to wake the device 22 up from the sleep mode.

If bus traffic or a vibration is detected at the decision diamond 54, then the device operation moves to box 56 to determine what region the device 22 is currently in and what protocols and algorithms would need to be used for that location. The algorithm running in the ECU 24 uses the GPS signals and the GNSS to determine the location of the device 22, and the vehicle state. Particularly, the device 22 would determine whether it is in the same vehicle it was in when it went to sleep, or whether it is now in a different vehicle at decision diamond 58. If the vehicle is identified at the decision diamond 58, then the algorithm will go through a device authentication process at box 60 to determine whether the device 22 is authorized to perform certain operations that may require a subscription or some verification that the device 22 is being used consistent with the discussion herein. This authentication process may require the device to communicate with a remote facility at box 62.

The algorithm then determines whether the device 22 has been authenticated at decision diamond 64, and if not, the device 22 can only operate in a standalone operation mode at box 66. The standalone operation mode is also allowed if the vehicle interface is not known at the decision diamond 58. The standalone operation mode may provide a number of operations for receiving signals from other vehicles and transmitting signals to those vehicles that only require GPS information. In the standalone mode, the device 22 will not be able to access most vehicle systems and will be limited in what operations it can perform because it has not been authenticated. During the standalone operation mode, the vehicle bus may go off where the device 22 goes to sleep at the box 52.

If the device 22 is authenticated at the decision diamond 64, then the device 22 goes into a connected operation mode at box 70. The connected operation mode is a more robust operation where the vehicle can send out messages of a more detailed vehicle operation. For example, if the vehicle is slipping on ice, where the traction control system and yaw rate sensors identify such a condition, the vehicle will be able to transmit those conditions to other vehicles on the communications link. Other applications would apply if the device 22 is connected to the vehicle systems for the connected operation mode, such as identifying suspension anomalies, such as the vehicle traveling over a pot hole, which can also be transmitted on the communications link. During the connected operation mode at the box 70, the device 22 is connected to the vehicle systems so that if a safety condition is received from another vehicle, the algorithm determines whether the vehicle has display access at decision diamond 72, and if so uses the appropriate visual, auditory or tactile availability at box 74 to warn the driver. If the vehicle does not have suitable display access at the decision diamond 72, then the algorithm provides some kind of device alert at box 68, such as audible tones. Likewise, during the standalone operation mode at the box 66, where the device 22 is not connected to the vehicle systems, and the device 22 receives a warning from another vehicle, that warning will also be provided to the vehicle operator as an alert at the box 68.

As will be well understood by those skilled in the art, the several and various steps and processes discussed herein to describe the invention may be referring to operations performed by a computer, a processor or other electronic calculating devices that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A plug-in device adapted to be selectively coupled to a vehicle, said plug-in device comprising:
- a transceiver for transmitting and receiving communications signals;
- a position device for providing vehicle position information;
- a memory for storing digital security certificates and vehicle application data; and
- a processor configured to be put in electrical communication with a vehicle controller area network (CAN) bus on the vehicle, said processor:
  - receiving vehicle location signals from the position device, files from the memory and signals from the transceiver,
  - providing signals for transmission to the transceiver,
  - identifying the vehicle that the plug-in device is coupled to,
  - providing data on the CAN bus identifying the plug-in device, and
  - performing self-configuring operations based on type of vehicle, access to vehicle systems and a geographic location of the vehicle.

2. The plug-in device according to claim 1 wherein the self-configuring operations include standards for geographic region, system security access, paid subscriptions and priorities for local environment.

3. The plug-in device according to claim 1 wherein the self-configuring operations for access to vehicle systems include determining whether access to vehicle systems are fully or partially granted based on device manufacturer, device type and purchased services.

4. The plug-in device according to claim 1 wherein the self-configuring operations for access to vehicle systems include vehicle information systems and vehicle control systems.

5. The plug-in device according to claim 1 wherein the processor is programmed to provide settings for a particular user.

6. The plug-in device according to claim 5 wherein the processor is programmed for the particular user by using a smart phone or near field communications.

7. The plug-in device according to claim 1 wherein the processor is programmed to download and identify digital certificates in connection with a secure message authentication system.

8. The plug-in device according to claim 1 wherein the processor is programmed to identify the geographic location of the vehicle and set features of the plug-in device based on restrictions for the geographic location.

9. The plug-in device according to claim 1 wherein the processor is programmed to perform an authentication process so as to set device operation capabilities.

10. The plug-in device according to claim 9 wherein the plug-in device is limited to a standalone operation mode that only requires position information when the plug-in device is not authenticated.

11. The plug-in device according to claim 9 wherein the plug-in device operates in a connected operation mode that provides enhanced device capabilities when the plug-in device is authenticated.

12. The plug-in device according to claim 1 wherein the plug-in device is configured to be coupled to an on-board diagnostic connector on the vehicle.

13. The plug-in device according to claim 1 wherein the plug-in device is configured to be coupled to a junction connector that is installed at a vehicle telematics module.

14. The plug-in device according to claim 1 wherein the transceiver is selected from the group consisting of a dedicated short range communications (DSRC) radio, a Wi-Fi radio, a Bluetooth radio and a long term evolution (LTE) radio.

15. The plug-in device according to claim 1 wherein the position device is a global positioning system (GPS) device.

16. A plug-in device adapted to be selectively coupled to an on-board diagnostic connector on a vehicle, said plug-in device comprising:

a radio for transmitting and receiving signals;

a position device for providing vehicle position information;

a memory for storing digital security certificates and vehicle application data; and a processor configured to be put in electrical communication with a vehicle controller area network (CAN) bus on the vehicle, said processor:

receiving vehicle location signals from the position device, files from the memory and signals from the transceiver, providing signals for transmission to the transceiver, identifying the vehicle that the plug-in device is coupled to, providing data on the CAN bus identifying the plug-in device, and being programmed to perform an authentication process so as to set device operation capabilities where the plug-in device is limited to a standalone operation mode that only requires position information when the plug-in device is not authenticated and the plug-in device operates in a connected operation mode that provides enhanced device capabilities when the plug-in device is authenticated.

17. The plug-in device according to claim 16 wherein the processor is programmed to download and identify digital certificates in connection with a secure message authentication system.

18. The plug-in device according to claim 16 wherein the processor is programmed to identify a geographic location of the vehicle and set features of the plug-in device based on restrictions for the geographic location.

19. The plug-in device according to claim 16 wherein the processor performs self-configuring operations based on type of vehicle, access to vehicle systems and a geographic location of the vehicle, wherein the self-configuring operations include standards for geographic region, system security access, paid subscriptions and priorities for local environment, wherein the self-configuring operations for access to vehicle systems include determining whether access to vehicle systems are fully or partially granted based on device manufacturer, device type and purchased services, and the self-configuring operations for access to vehicle systems include vehicle information systems and vehicle control systems.

20. The plug-in device according to claim 16 wherein the processor is programmed to provide settings for a particular user.

21. The plug-in device according to claim 16 wherein the radio is selected from the group consisting of a dedicated short range communications (DSRC) radio, a Wi-Fi radio, a Bluetooth radio and a long term evolution (LTE) radio.

22. The plug-in device according to claim 16 wherein the position device is a global positioning system (GPS) device.

* * * * *